A. ROSS.
AUTOMATIC SHIFT FOR SAW SHARPENING MACHINES.
APPLICATION FILED FEB. 23, 1915.
1,210,697.
Patented Jan. 2, 1917.
3 SHEETS—SHEET 1.
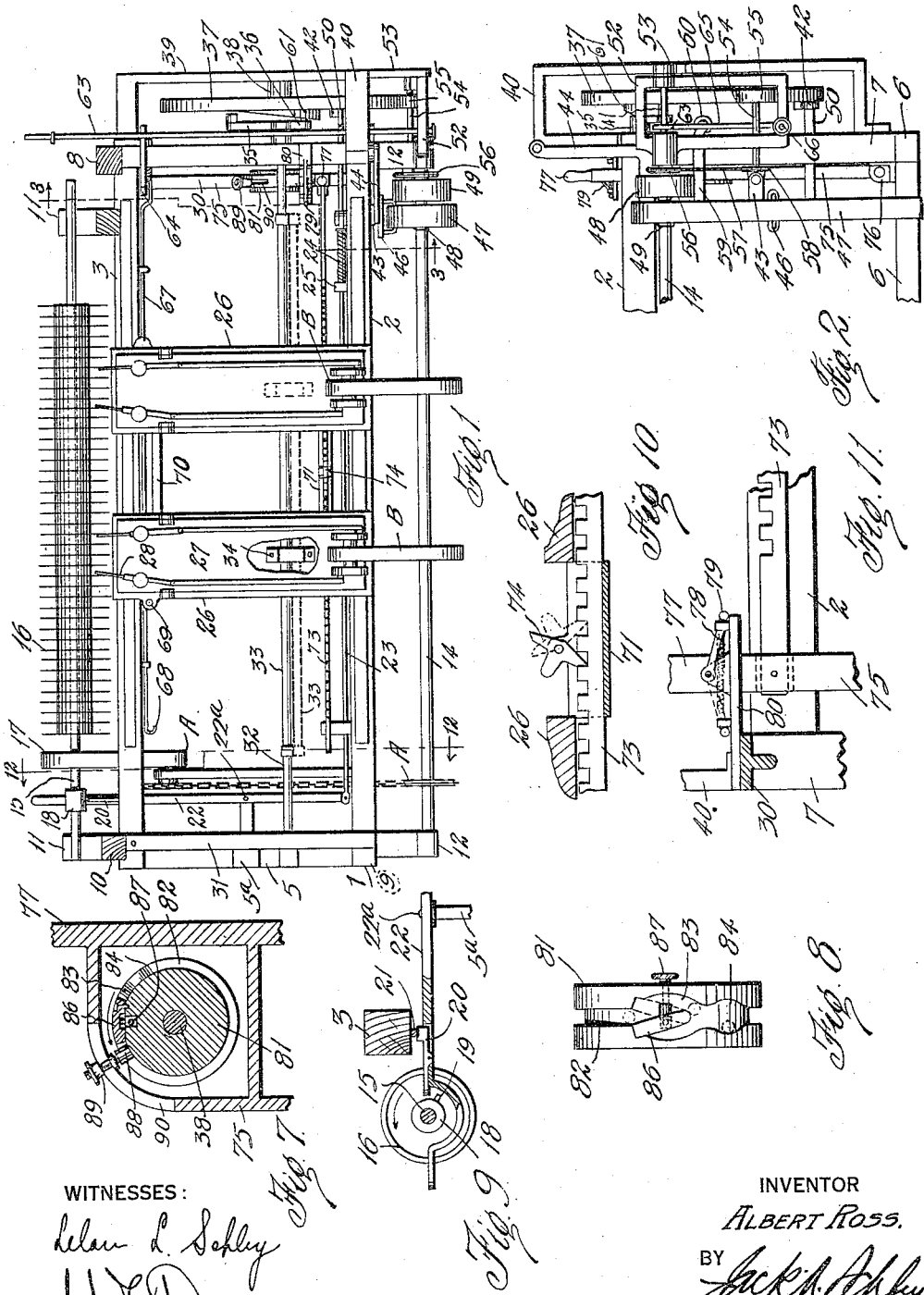
WITNESSES:
INVENTOR
ALBERT ROSS.
BY
ATTORNEY A. ROSS.
AUTOMATIC SHIFT FOR SAW SHARPENING MACHINES.
APPLICATION FILED FEB. 23, 1915.
1,210,697.
Patented Jan. 2, 1917.
3 SHEETS—SHEET 2.
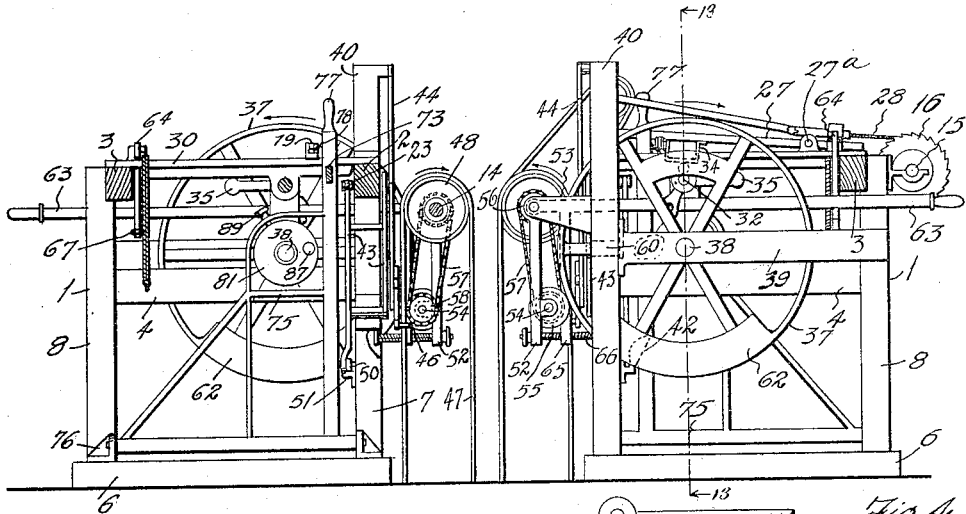
Fig. 4.
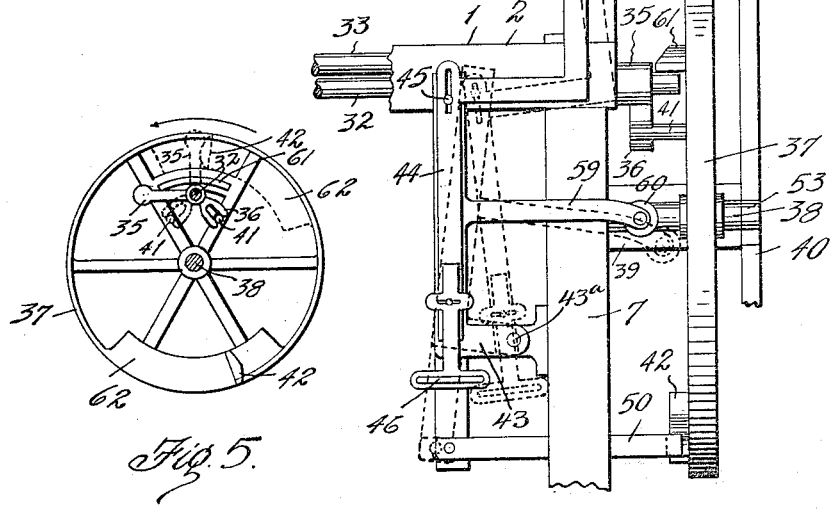
Fig. 5.
Fig. 6.
WITNESSES:
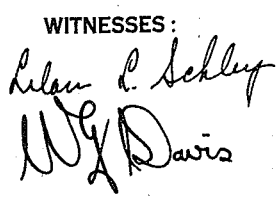
INVENTOR
ALBERT ROSS.
BY
*Jacob A. Schley*
ATTORNEY

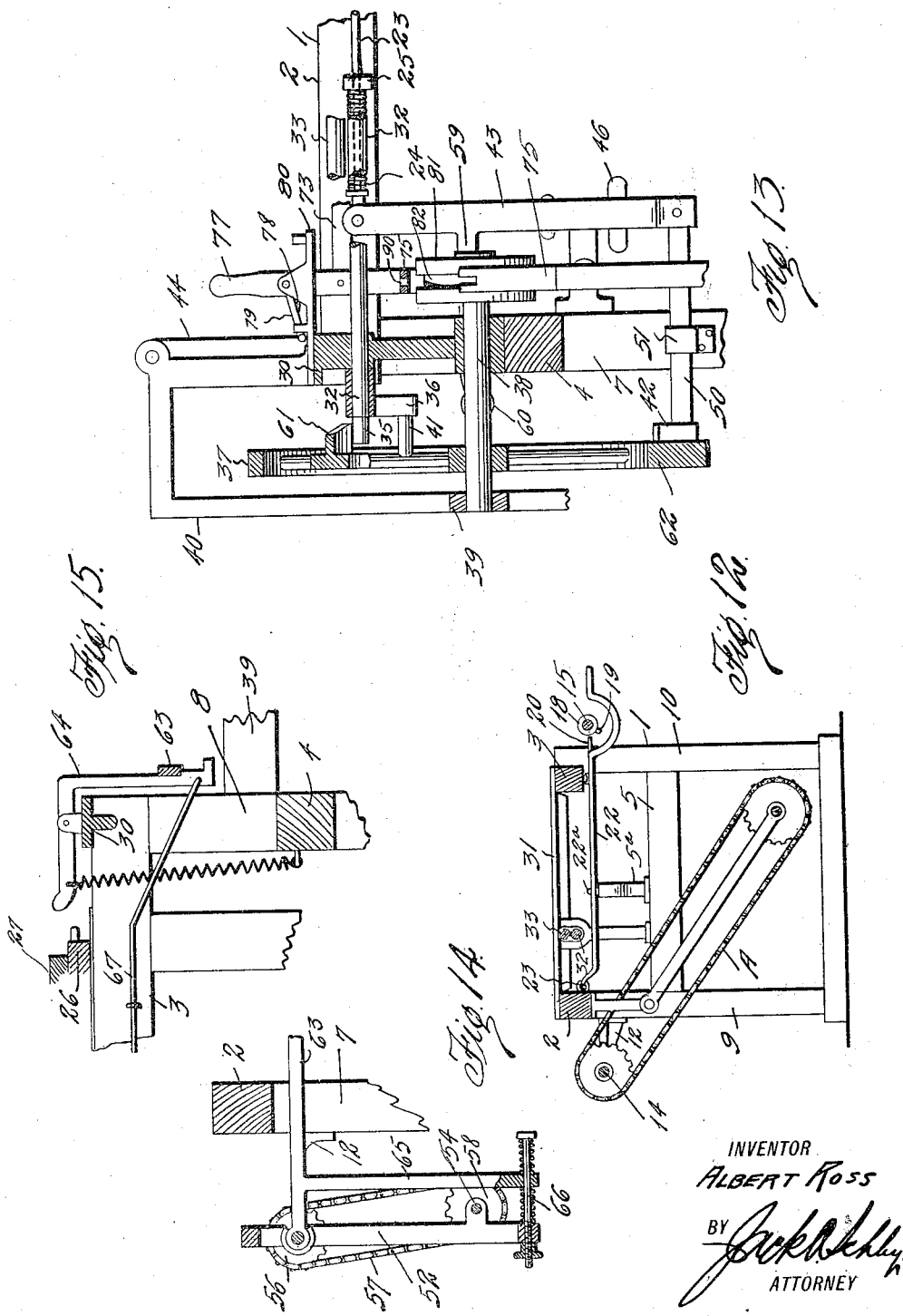

UNITED STATES PATENT OFFICE.

ALBERT ROSS, OF DALLAS, TEXAS, ASSIGNOR OF ONE-THIRD TO WM. M. DUGAN AND ONE-THIRD TO J. W. CARTER, BOTH OF TARRANT COUNTY, TEXAS.

AUTOMATIC SHIFT FOR SAW-SHARPENING MACHINES.

1,210,697. Specification of Letters Patent. Patented Jan. 2, 1917.

Application filed February 23, 1915. Serial No. 9,796.

*To all whom it may concern:*

Be it known that I, ALBERT ROSS, citizen of the United States, residing at Dallas, in the county of Dallas and State of Texas, have invented certain new and useful Improvements in Automatic Shifts for Saw-Sharpening Machines, of which the following is a specification.

This invention relates to new and useful improvements in automatic shifts for saw sharpening machines.

The object of the invention is to provide an apparatus designed to be attached to a saw filing and gumming machine and constructed to automatically step up the carriage after each revolution of the saw cylinder and to carry out this operation by particular mechanism.

Another object of the invention is to provide an attachment constructed to interrupt the transmission of motion to the machine when the sharpening of the saw is complete; then to elevate the swing frame so that the files or gummers are moved out of the saws; then to step the carriage to the next position; then to lower the swing frame so that the sharpening instruments are positioned to engage the next saw to be sharpened; and then to restore the transmission of motion to the machine.

A still further feature resides in the provision of a master wheel constructed to set certain parts of the apparatus into operation when revolved and means associated with the wheel arranged to impart revolution to the wheel and itself constructed to be automatically set to operate.

Among other novel features are the provision of means for stepping the carriage of the machine in either direction; an automatic stopping device operated by the carriage at either end of its travel; an operating cam of peculiar construction; and the provision of a novel belt shifting device.

A still further object of the invention is to provide a device of the character described that will be strong, durable, efficient, and comparatively inexpensive and simple to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a plan view of a saw filing machine with my invention attached thereto, Fig. 2 is a front elevation of one end of the machine, Fig. 3 is a transverse sectional view on the line 3—3 of Fig. 1, Fig. 4 is an elevation of the driving end of the machine, Fig. 5 is an elevation of the master wheel, Fig. 6 is a detail in elevation of the belt shifting device, Fig. 7 is a sectional detail of the carriage stepping cam, Fig. 8 is a plan view of the same, Fig. 9 is a sectional detail of the release lever and tripping collar parts, Fig. 10 is a detail of the carriage rack bar and dog mechanism, Fig. 11 is a detail of the rack bar tension device, Fig. 12 is a transverse vertical sectional view taken on the line 12—12 of Fig. 1, Fig. 13 is a longitudinal vertical sectional view of a portion of one end of the machine on line 13—13 of Fig. 4, Fig. 14 is a view of the swinging frame and component parts, and Fig. 15 is a detail in elevation of the tripping mechanism for the swinging frame.

In the drawings the numeral 1 designates the frame of a saw filing machine which frame comprises top rails 2 and 3, end cross timbers 4 and 5, sills 6, and corner posts 7, 8, 9 and 10 respectively. Saw bearing brackets 11 are mounted on one side of the machine as is shown in Fig. 1; while on the other side bearing brackets 12 support a driving shaft 14, said brackets 12 being mounted on the posts 7 and 9. The brackets 11 are adapted to receive the mandrel 15 of a saw cylinder 16 which is to be sharpened.

After the saw cylinder is placed a pulley 17 which has been fastened on the mandrel is connected by a driving mechanism A with the shaft 14 from which motion is transmitted to revolve the saw cylinder. Also a tripping collar 18 is fastened on the mandrel adjacent the pulley and has a lug 19 extending from its periphery as is shown best in Fig. 9. A trigger 20 pivoted in a releasing lever 22 projects into the path of the lug 19 and is swung thereby once during each revolution of the saw cylinder. The trigger normally engages a keeper 21 mounted on the underside of the top rail 3. The lever is pivoted at 22ª on a bracket 5ª mounted on the cross timber 5 on the frame and has pivotal connection with the end of a throwing rod 23 passing through a stud 25 on the rail 2, against which stud a coiled spring 24 encircling the rod, is normally compressed. The throwing rod is adapted to be connected to a belt shifter hereinafter described and when the trigger is tripped and withdrawn from the keeper, the spring 24 immediately throws the rod 23 to the right (Fig. 1) whereby the lever 22 is swung and the belt also shifted. The free end of said lever constitutes a handle by which the parts may be manually restored to their normal positions.

On the top rails 2 and 3 one or more carriages 26 are mounted to slide longitudinally of the frame 1. Each carriage has pivoted thereon at 27$^a$ a swing frame 27 carrying a file driving mechanism B driven from the shaft 14 and reciprocating files 28 adapted to engage the saws of the cylinder 16. These frames are normally tilted upward as shown in Fig. 4 whereby the files are between the saws and when it is desired to step up the carriages, the rear of the swing frames must be lowered to swing the points of the files out of the saw cylinder.

The parts which have been described up to this point form no part of this invention but are now in common use and the description has been given for the purpose of clearly explaining the invention which is an attachment for saw filing machines.

Across each end of the frame 1, I secure supports 30 and 31 respectively having their ends resting on the top rails 2 and 3 and the support 30 depending on to the timber 4 and the support 31 resting on the timber 5. These supports carry bearings in which a rock shaft 32 extending longitudinally of the machine is mounted. Throughout the greater portion of its length the rock shaft carries eccentrically a bar 33 normally engaging shoes 34 depending from the frames 27 of the carriages as is shown in Figs. 1 and 4. In its normal position the bar 33 stands directly over the rock shaft and it is evident that by giving the rock shaft a quarter revolution said bar would be swung down relatively at the side of the shaft thus lowering the rear of the swing frames of the carriages and raising the files 28 out of the saw cylinder.

The rock shaft extends through the support 30 and has fixed on its end a bell crank lever 35 the longest arm of which normally occupies a horizontal position while the short arm 36 which is slotted depends as is best shown in Fig. 5. A master wheel 37 is mounted on a stub shaft 38 supported by the timber 4 and a horizontal bracket 39 which is secured to the post 8 and to a vertical hanger 40 which is mounted on the post 7. A pin 41 projecting from the master wheel normally engages the slotted or forked arm 36 of the bell crank lever whereby said lever is immovably held and the rock shaft 33 locked so as to hold the swing frames of the carriages elevated. Referring to Figs. 4 and 5 the master wheel 37 revolves in the direction indicated by the arrow in each figure whereby the pin 41 swings the lever 35 so that it occupies the position shown in dotted lines in Fig. 5. This movement rocks the shaft 32 a quarter of a revolution whereby the bar 33 is permitted to swing down and the rear ends of the swing frames 27 to be lowered. The pin is carried out of the arm 36 as the master wheel revolves and the long arm of the bell crank lever is left standing in the path of a lug 42 also mounted on said wheel. After the wheel has revolved and other operations have been carried out the lug 42 engages the lever 35 and swings it down whereby the swing frames are again elevated.

An angular belt shifting lever 43 has the outer ends of its short arms pivoted on the post 7 below the timber 4 as shown at 43$^a$ in Fig. 6; while its long arms project upward and straddle the rail 2. On the inner side of the said rail 2 the lever 43 is pivoted to the end of the throw rod 23 and when the release lever 22 is tripped the spring 24 causes the rod to throw the lever 43 into the position shown in dotted lines in Fig. 6. An angular link 44 has its upper end pivoted to the upper end of the hanger 40 and has slotted connection with a pin 45 projecting from the upper end of the lever 43 whereby said lever swings the link. On the lower end of the link a belt shifting loop 46 is adjustably mounted.

The inner leg of a belt 47 passes through the loop and is shifted thereby. The belt passes over a pulley 48 fixed on the shaft 14 whereby the saw filing machine is driven. A loose pulley 49 is loosely confined on said shaft in juxtaposition to the pulley 48 so as to receive the belt when the same is shifted. The link 44 is employed to obtain a sufficient throw of the loop 46 to shift the belt which is not obtainable directly from the lever 43 when the belt is driven from below. If the machine was driven from above the link would be omitted and the loop 46 suitably attached directly to the lever 43.

The lever 43 has a depending portion which is pivoted at its lower end to a latch 50 supported in a bracket 51 mounted on the inner side of the post 7 and extending to the master wheel 37 where its free end is engaged by the lug 42 and acts as a stop to limit the revolution of said wheel. When the belt shifting lever is displaced the latch 50 is withdrawn so that the wheel may be revolved. When the belt shifting lever 43 is thrown as above described the belt 47 is carried onto the loose pulley 49 and the transmission of motion to the shaft 14 interrupted whereby the parts of the saw filing machine are thrown out of operation.

A swinging frame 52 is hinged on one of the brackets 12 and an arm 53 projecting from the hanger 40. A counter shaft 54 is mounted on the lower portion of said frame and carries a friction pinion 55 bearing against the periphery of the master wheel 37. A sprocket wheel 56 fixed to the hub of the loose pulley 49 drives a sprocket chain 57 which transmits motion to a sprocket 58 mounted on the shaft 54. In this way motion is imparted to the master wheel when the belt is shifted to the loose pulley. As the master wheel revolves it swings the bell crank lever 35 as before described and when completing its revolution shifts the lever 43 so as to throw the belt back on to the driving pulley and again start the machine. For carrying out the latter operation a yoke 59 extends at right angles from the lever 43, straddles the post 7 and supports at its extremities a roller 60. When the lever 43 is first shifted the roller is carried toward the wheel 37 as shown in dotted lines in Fig. 6 and is thus placed in the path of a cam 61 mounted on said wheel. This cam is so positioned that the wheel will nearly complete three fourths of its revolution by the time the cam 61 is brought into contact with the roller 60. The cam has an inclined face and forces the roller away from the wheel whereby the lever 43 is returned to its normal position and the belt shifted from the loose pulley to the fast pulley 48. For completing the revolution of the master wheel the same is provided with a counter weight 62 which continues to revolve said wheel until the lug 42 strikes the latch 50.

For interrupting the transmission of motion from the loose pulley to the master wheel and swinging the pulley 55 out of engagement therewith a lever 63 has one end pivoted in the upper portion of the frame 52 concentric with the pivot point thereof, and extends across the end of the frame 1 beyond the top rail 3 as shown. A bell crank lever 64 pivoted on the standard 30 has a hooked end engaging under said lever and supporting it. Near its pivot end an arm 65 depends from the lever 63 and is pierced by a tension device 66 which also passes through the lower end of the frame 52 and forces the pinion 55 into contact with the master wheel. The frictional contact or pressure of the pinion on the wheel 37 depends upon the tension exerted by the device 66.

It is obvious that when the carriages reach either end of the frame at which point all of the saws would have been filed and it would not be desired to shift the belt 47 from the loose pulley but would be necessary to keep the belt on the loose pulley, the transmission of motion to the master wheel must be interrupted which is accomplished by swinging the bell crank lever 64 so that the lever 63 will swing downward and thus swing the pinion 55 away from the master wheel. For automatically performing this operation a rod 67 is mounted to slide on the inner side of the rail 3 and has connection with the hook leg of the bell crank lever which lever is spring held in its normal position. At its free end which is near the opposite end of the frame to that carrying the lever 64 the rod 67 has a hook 68 in the path of a projection 69 carried by one of the carriages 26 and when said projection engages the hook the said rod is pulled and the lever 64 swung whereby the lever 63 is permitted to swing down as described. When the carriages traveling in the opposite direction reach the end of the frame one of them engages the horizontal arm of the lever 64 and swings it whereby the lever 63 is released. The lever 63 is manually raised to restore the contact of the pinion 55 with the master wheel.

During the interim between the two operations of the bell crank lever 35 the carriages are stepped up to position them for filing the next saws. The carriages 26 are tied together by any suitable means as a strap 70; while between the carriages a sleeve 71 is disposed. A rack bar 73 is disposed longitudinally of the frame 1 and passes through the sleeve immediately under the carriages. A reversible dog 74 is pivoted in the sleeve over the rack bar so as to engage the teeth of the same as is best shown in Fig. 10. It is obvious that when the rack bar is pulled against the dog movement will be given the carriages in the direction of travel of the said bar. It is apparent that when the direction of movement of the rack is to be reversed the dog is manually reversed to work in harmony therewith; and thus the carriages may be intermittently moved in either direction on the rails 2 and 3.

For reciprocating the rack bar a rocker frame or member 75 has its trunnions mounted in bearing brackets 76 secured on the sills 6 against the corner posts 7 and 8. The frame 75 has adjacent the rail 2 an upright 77 to which one end of the rack bar 73 is pivoted and thus by swinging the said frame the bar is reciprocated. The bar and frame are under spring tension, a coiled spring 78 being connected at one end to a lever 79 mounted in bracket 80 projecting from the standard 30 and having its other end attached to the upright 77 below the pivot point of the lever 79. By swinging the lever 79 (Fig. 11) the spring tension is reversed. The lever 79 is always adjusted to exert the spring tension in opposition to the direction in which the rack bar is moved to step up the carriages and the function is that of throwing the next rack tooth past the dog and eliminating lost motion.

We have now arrived at the means for swinging the frame 75 which consists of a grooved cam 81, best shown in Figs. 3, 7 and 8. This cam is fixed on the inner end of the stub shaft 38 which also carries the master wheel 37. The groove 82 of the cam receives a roller 88 confined on the lower end of a stud 89 which is adjustably fastened in a slot 90 in the frame 75. It is obvious that lateral displacement of the stud would swing the frame and reciprocate the rack bar. The groove has two enlargements 83 and 84 respectively which provide two offsets on each side of the groove. In the enlargement 83 a switch tongue 86 is pivoted and may be swung to either side by adjusting a screw 87 mounted in the cam.

The direction of throw of the frame 75 and rack bar 73 is controlled by the position of the switch tongue which in Fig. 8 is shown in full lines set to cause the carriages to be stepped to the right with reference to Fig. 1; while the position indicated by dotted lines would reverse the operation. It is apparent that the stud roller 88 will follow the contour of the groove and will be diverted into the enlargement 83 by the switch tongue 86 along which latter the roller 88 travels until reaching the enlargement 84, when through the agency of the spring 78 the frame 75 is swung in the opposite direction and the roller diverted into the opposite side of the enlargement 84 with reference to the side of the enlargement 83 through which it has just traveled. This gives the rack bar a slight over-throw so that the same will be moved more than the distance of one tooth to assure the engagement of the dog 74 with the next tooth to the one previously engaged. It will be understood that the passage of the roller through the enlargement 83 reciprocates the rack bar and the purpose of the enlargement 84 is to cause the over-throw of the rack bar after the carriages have been moved. The cam is positioned on the shaft 38 so that the entrance to the enlargement 83 is not brought to the roller 88 until after the bell crank lever 35 is first swung and the swing frames 27 of the carriages 26 lowered; and the enlargement 84 is carried past the roller before the lug 42 engages the lever 35 to again elevate the swing frames.

The operation of the machine and apparatus is as follows: The saw cylinder 16 having been placed in the brackets 11 and the pulley 17, collar 18 and carriages 26 having been set in position the release lever 22 is swung so as to shift the belt 47 from the loose pulley 49 to the fast pulley 48 whereby motion is imparted to the shaft 14 and transmitted by the driving mechanisms A and B to the saw cylinder and the filing devices of the carriages. When the cylinder is started the lug 19 is just over the trigger 20 and when the cylinder completes a revolution, during which all the teeth of two saws are filed, the lug 19 engages the trigger and trips the same. When the trigger is tripped the lever 22 is released and the throwing rod 23 is likewise released and thrown by the spring 24 whereby the belt shifting lever 43 is swung to the position shown in dotted lines in Fig. 6, the belt 47 thus being shifted from the fast pulley to the loose pulley and the transmission of motion to the shaft 14 when interrupted. The machine is now idle, but when the lever 43 was shifted it withdrew the latch 50 from the lug 42 and at the same time motion was imparted to the master wheel 37 through the agency of the sprocket 56, belt 57, sprocket 58 and friction pulley 55. The initial movement of the master wheel swings the lever 35 and during the first quarter of the revolution the rock shaft 32 is swung by the lever 35, the bar 33 being swung down and the swing frames 27 lowered by which the files 28 are elevated and swung out of the saw cylinder. During the next period of the revolution of the wheel the enlargement 83 of the cam 81 is brought to the roller 88 of the stud 89 and as this portion of the cam is traversed the rocker frame 75 is first swung toward one end of the frame 1 whereby the rack bar 73 is pulled in the same direction against the tension of the spring 78 and the carriages through the agency of the dog 74 stepped a space equal to the distance between two saws; then the rocker frame is swung back to its normal position and the enlargement 84 arrives at the roller with the result that the spring 78 throws the rocker frame farther in the same direction whereby the rack bar is moved altogether a distance slightly greater than that of one tooth which assures the engagement of the dog 74 with the next tooth to the one previously occupied. As the enlargement passes from the roller the rocker frame is swung back to normal thus taking up the over-throw of the bar. During the next period of the revolution the lug 42 engages the lever 35 and swings the same down whereby the rock shaft 33 is swung and the swing frames elevated whereby the files are lowered to the saws. Next the cam 61 comes into contact with the roller 60 and swings the lever 43 so that the belt is shifted back onto the fast pulley and the latch 50 projected into the path of the lug 42. The master wheel at this point has not completed its revolution and as it receives no more power from the loose pulley, the counter weight 62 is employed to complete the revolution. This operation is carried out each time the saw cylinder completes a revolution. When the carriages reach either end of their travel the rod 57 is pulled whereby the bell crank lever 64 is swung and the lever 63 released thus swinging the pinion 55 out of contact with the master wheel.

The invention is presented as including all such changes and modification as properly come within the scope of the appended claims.

What I claim is:

1. In a device of the character described, the combination with a driving belt; of a sliding carriage, saw sharpeners carried by said carriage; a shaft with tight and loose pulleys thereon; connections whereby said sharpeners are reciprocated when said driving belt is on the tight pulley; a belt shifting device; and means set to operate when the belt shifting device shifts the belt to the loose pulley to lift the saw sharpeners from the saws, step the carriage to the next position, set the sharpeners to the saw and finally to operate the belt shifting device to shift the belt to the tight pulley and then come to rest.

2. In a device of the character described, the combination with a driving belt, a sliding saw carriage carrying saw sharpeners, tight and loose pulleys correlated with said belt, and connections whereby said sharpeners are reciprocated when said belt is on the tight pulley; of a belt shifting device, means for operating the belt shifting device, a master wheel set in motion when the belt is shifted to the loose pulley, a device for lifting the carriage operated by the wheel, a rocking member operated by the wheel, a rack bar connected with the rocking member and operated thereby to slide the saw carriage which it engages, a tripping device in the path of the wheel connected with the carriage lifting device for lowering the carriage after the same has been slid, and means set to operate by the wheel for operating the belt shifting device to restore the belt to the tight pulley.

3. In a device of the character described, the combination with the frame of a saw sharpening machine, a driving belt, a sliding saw carriage carrying saw sharpeners operated by said belt, tight and loose pulleys correlated with said belt, and connections between said belt and the sharpeners whereby said sharpeners are reciprocated when said belt is on the tight pulley; of a belt shifting device; means set to operate when said belt shifting device shifts the belt to the loose pulley to lift the saw sharpeners from the saws, step the carriage to the next position, set the sharpeners to the saws and finally to operate the belt shifting device to shift the belt to the tight pulley and then come to rest; and a stopping device mounted on the frame and in the path of the sliding carriage and constructed to throw the said operating means out of operation when encountered by said carriage.

4. In a device of the character described, the combination with a driving belt, a sliding carriage carrying saw sharpeners, tight and loose pulleys correlated with said belt, and connections whereby said sharpeners are reciprocated when said belt is on the tight pulley; of a belt shifting device, means for operating the belt shifting device, a master wheel having provision for operating component parts, said wheel being set in rotation by the shifting of the belt from the tight to the loose pulley, means for lifting the saw sharpeners operated by the wheel, means for stepping the carriage to its next position operated by the wheel, means for lowering the sharpeners operated by the wheel, and means carried by the belt shifter for restoring the same to its normal position and projecting into the path of the wheel when the belt is shifted from the tight to the loose pulley.

5. In a device of the character described, the combination with a driving belt, a sliding carriage carrying saw sharpeners, tight and loose pulleys correlated with said belt, and connections whereby said sharpeners are reciprocated when said belt is on the tight pulley; of a belt shifting device, means for operating the belt shifting device to shift the belt to the loose pulley, a master wheel revolved by the loose pulley, a lifting member operated by the wheel for elevating the saw sharpeners, a cam operated by the wheel, a rocker operated by the cam, a connection between the rocker and the carriage whereby the latter is stepped to its next position when the rocker is operated, and means for shifting the belt device to restore the belt to the tight pulley.

6. In a device of the character described, the combination with the frame of a saw sharpening machine, a driving belt, a revolving saw shaft, a slidable carriage carrying saw sharpeners, a drive shaft having a tight pulley driven by said belt, and driving connections between the drive shaft and the saw sharpeners; of a belt shifting device, a loose pulley correlated with the tight pulley; a belt shifting operating member set to operate by the revolving saw shaft whereby the belt is shifted from the tight pulley to the loose pulley and the revolution of the saw shaft and the operation of the sharpeners interrupted; and means set to operate by the loose pulley to perform in successive order, the operation of lifting the saw sharpeners out of the saws, the stepping of the carriage up to the next position, the lowering of the sharpeners to the saws, and the shifting of the belt shifter whereby the belt is moved onto the tight pulley.

7. In a device of the character described, the combination with a driving belt, a sliding carriage carrying saw sharpeners, tight and loose pulleys correlated with said belt, and connections whereby said sharpeners are operated when said belt is on the tight pulley; of a belt shifting device, a master wheel operated by the loose pulley when said belt is shifted thereto, means operated by the wheel for moving the sharpeners out of operative position, a carriage shifting device, a rocker member connected with the carriage shifting device, a cam rotated by the wheel and having connection with the rocker member for rocking the same, said carriage being stepped to the next position by the operation of the said shifting device, means on the cam for reversing the movement of the rocker member whereby the shifting of the carriage in a reverse direction is effected, and means on the master wheel for restoring the parts to their normal operative positions.

8. In a device of the character described, the combination with a slidable carriage carrying saw sharpeners, tight and loose pulleys, a driving belt normally on the tight pulley, and connections between the tight pulley and the sharpeners whereby the latter are operated; a master wheel, a belt shifter, means for shifting the belt from the tight pulley to the loose pulley, means operated by the master wheel for shifting the carriage, a driving connection between the loose pulley and the master wheel, and means interposed in said driving connection for interrupting the transmission of motion from the loose pulley to the wheel.

9. In a device of the character described, the combination with a slidable carriage carrying saw sharpeners, tight and loose pulleys, a driving belt normally on the tight pulley, and connections between the tight pulley and the sharpeners whereby the latter are operated; a master wheel; a belt shifter; means for operating the belt shifter to shift the belt from the tight to the loose pulley; means operated by the master wheel for shifting the carriage; and a driving connection between the loose pulley and the wheel, said connection including a movable support, a friction wheel mounted on the support and positioned to engage the master wheel, and a driving connection between the loose pulley and the friction wheel.

In testimony whereof I affix my signature in presence of two witnesses.

ALBERT ROSS.

Witnesses:
JACK A. SCHLEY,
W. L. DAVIS.

Copies of this patent may be obtained for five cents each, by addressing the "Commissioner of Patents, Washington, D. C."